Aug. 27, 1963
L. J. STERNER ETAL
3,101,759
BALE SHREDDER
Filed Nov. 8, 1960
2 Sheets-Sheet 1
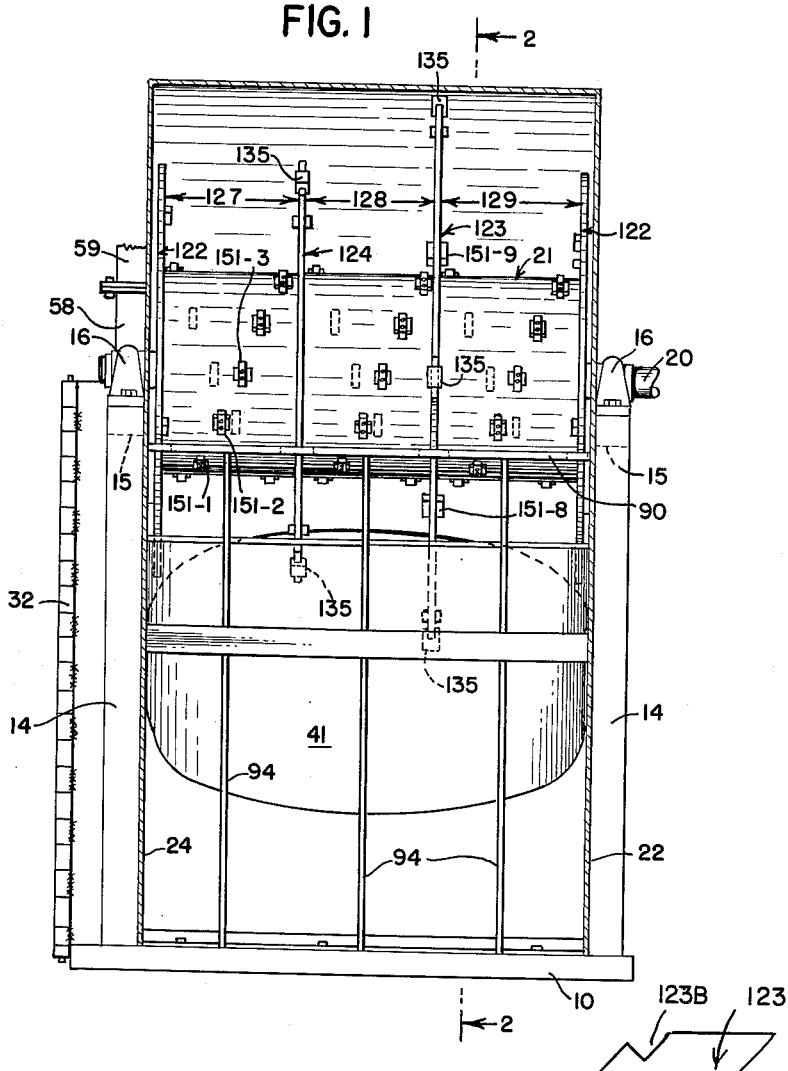
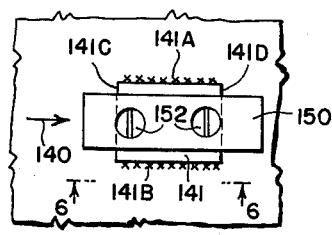
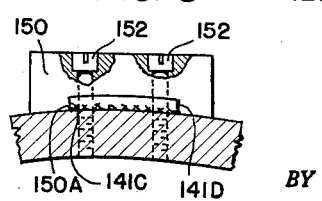
INVENTORS
LEANDER J. STERNER
GERALD J. STERNER
BY Dugger & Johnson
ATTORNEYS Aug. 27, 1963
L. J. STERNER ETAL
3,101,759
BALE SHREDDER
Filed Nov. 8, 1960
2 Sheets-Sheet 2
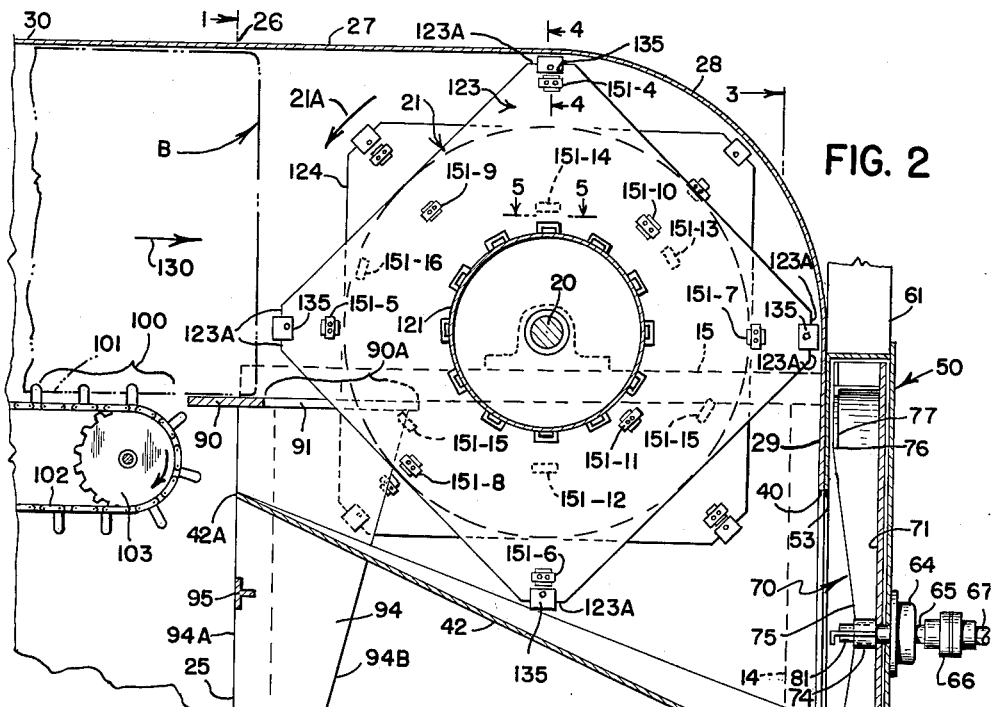
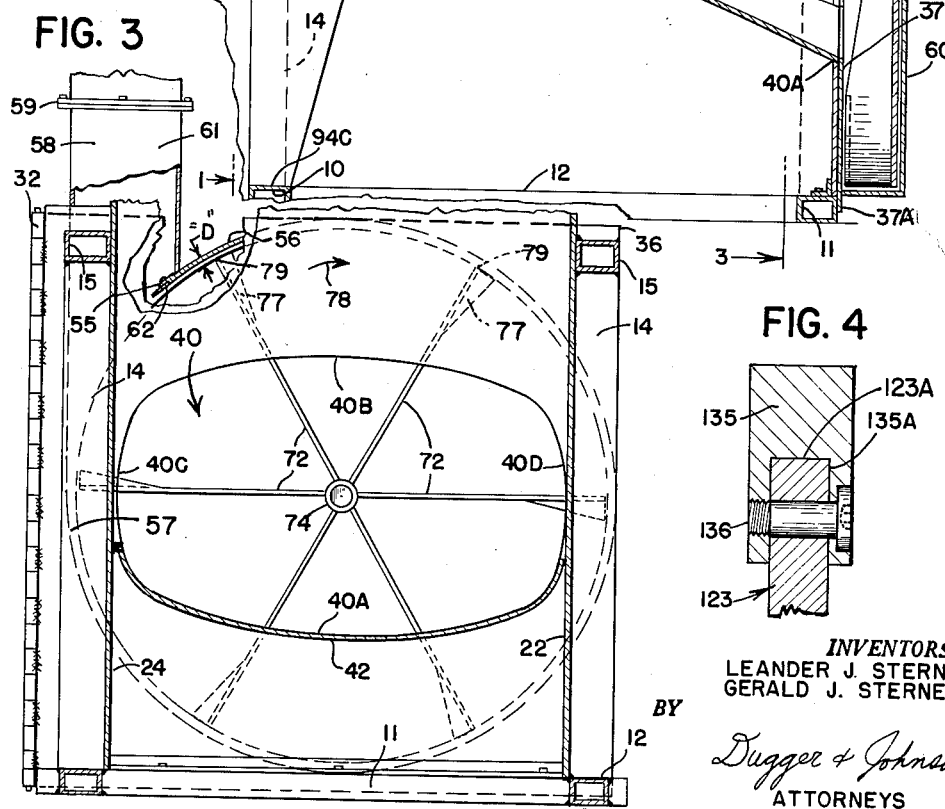
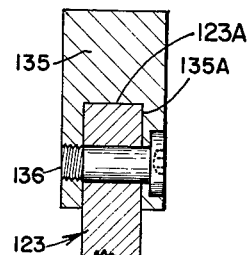
INVENTORS
LEANDER J. STERNER
GERALD J. STERNER
BY
*Dugger & Johnson*
ATTORNEYS

United States Patent Office 3,101,759
Patented Aug. 27, 1963

3,101,759
BALE SHREDDER
Leander J. Sterner and Gerald J. Sterner, Winsted, Minn., assignors to Sterner Industries, Inc., Winsted, Minn., a corporation of Minnesota
Filed Nov. 8, 1960, Ser. No. 68,098
4 Claims. (Cl. 146—70.1)

This invention relates to bale opening and shredding devices, and particularly to rugged machines which may be used in commerce and industry, as well as on the farm, for opening and shredding apart bales of agricultural material such as straw, hay and the like fibrous or forage materials.

It is an object of the invention to provide an improved bale opener and shredder. It is another object of the invention to provide an improved bale opening and shredding device capable of producing a finely shredded output with a minimum horsepower input to the machine. It is another object of the invention to provide an improved bale opening and shredding machine wherein the bale is preliminarily shredded and thereupon further broken and reduced into separated particles in the machine. It is another object of the invention to provide an improved low-cost, rugged bale opening and shredding device.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles may be employed.

The invention is illustrated with reference to the drawings wherein FIGURE 1 is a front elevational view partly in section of an exemplary embodiment of the bale shredding device of the present invention. FIGURE 1 is taken along the line and in the direction of arrows 1—1 of FIGURE 2. FIGURE 2 is a vertical sectional view of the bale shredding device shown in FIGURE 1. FIGURE 2 is taken along the line and in the direction of arrows 2—2 of FIGURE 1. FIGURE 3 is a vertical sectional view of a component of the bale opening and shredding devie, exemplified in FIGURES 1 and 2, FIGURE 3 being taken along the line and in the direction of arrows 3—3 of FIGURE 2. FIGURE 4 is an enlarged fragmentary sectional view taken along the line and in the direction of arrows 4—4 of FIGURE 2. FIGURE 5 is an enlarged fragmentary plan view of one form of shredder teeth taken along the line and in the direction of arrows 5—5 of FIGURE 2. FIGURE 6 is an enlarged fragmentary side elevational view, partly broken away, taken in the direction of arrows 6—6 of FIGURE 5. FIGURE 7 is a fragmentary side elevational view of one corner of a breaker plate, showing one form of "tooth" formation. Throughout the drawings the corresponding numerals refer to the same parts.

Referring to the drawings, the machine comprises a frame composed of bottom rails 10 and 11, which extend transversely across the machine. These rails are connected by side rails, of which rail 12 is shown in FIGURE 2. Upon the rectangular frame thus formed, there are provided posts 14 at the side of the machine upon which the top rails 15 are placed so as to provide support for a pair of bearings 16—16. The bearings rotatably support the shaft 20, upon which the rotor generally designated 21 is mounted in the direction of the arrow 21A. Upon the inner surfaces of the posts 14 there are provided upwardly extending side plates 22—24 which are of a shape such that they extend upwardly along the line 25 at the front of the machine, to the point 26 and then along the horizontal top edge 27 until intersecting the arcuate portion 28 which is a segment of a circle taken around the axis of the shaft 20, as a center. This curve smoothly blends into the back edge 29 of the plates, which extends down along the rear edge of the back posts 14. A top sheet connects the two side plates together beginning at the overhanging end 30 and extending along the lines 26, 27, 28 and 29 and then downwardly and becomes the backwall of the machine at 29. Below the level of the rails 15, the rear back wall plate 29 of the machine extends straight down as illustrated in FIGURE 3 and is fastened to the rear faces of back posts 14. The rear back wall plate 29 has a leftward extension as shown in FIGURE 3 and is provided with a vertical hinge 32 for mounting the shredder-blower as will be explained.

The rear plate 29 is provided with an aperture 40 of the shape shown in FIGURE 3. This aperture 40 has a curved bottom portion 40A, which extends from side to side of the machine to approximately the full width of the machine between the inner faces of the posts 14. The aperture is similarly curved at 40B. The top and bottom curves are connected by arcuate segments 40C and 40B which are smoothly connected to form the aperture 40 as shown. The closure of the machine housing is by means of a chute plate 42, FIGURE 2, which has a straight upper front horizontal edge 42A (see FIGURE 2) and a rear curved edge which corresponds to the curve of 40A of the opening 40. The plate 42 is accordingly slanted downwardly as shown in FIGURE 2, and its lower rear edge is welded to the back plate 29 along the edge 40A of the aperture. The plate 42 is extended so as to contact the inner surface of side plates 22—24, to which the plate 42 is welded along the line of contact with such side plates.

The fan housing 50 has a forward face plate 37 which coincides with the shape of the rear plate 29 of the machine, that is to say, the fan housing has an upper edge running along from corner 32 to a corner 36 and then downwardly to approximately the level 37A, and then horizontally across to the bottom. This plate is hinged at 32 to the rear plate 29 of the machine housing. The front plate of the fan housing has an aperture 53 which corresponds with the aperture 40 previously described, and consequently when the front plate 37 of the fan housing is swung on hinge 32 into facing relation against the rear plate of the machine, the two apertures 40 and 53 will coincide. The fan housing has a circular scroll beginning at the edge 55, see FIGURE 3, and extending around the circular arc 56 to the point 57, from which point the scroll extends upwardly into the stack section 58 terminating at the flange 59. The stack is rectangular and closes at right wall 61 to the scroll plate 56. It will be noted that the scroll housing therefore has a sharp edge 55, which partially projects into the area occupied by the delivery stack 58—61, and this edge 55 is provided with an integral or removable cutting knife 62.

On the rear plate 60 of the fan housing there is provided a strong journal 64 in which the fan shaft 65 is rotatably mounted, said shaft being provided with an easily separated coupling 66 by which it may be connected to power shaft 67. The shaft 65 serves rotatably to mount the fan and cutter blade assembly generally designated 70. The fan has the circular back plate 71 which extends to within a very small distance "D" of the circular housing scroll 56—57, see FIGURE 3. The plurality of fan blades 72—72 (six shown) are attached to the fan plate 71, these blades being straight radial blades attached to the center hub 74, which is an integral part of back plate 71 of the fan. Each blade extends outwardly along the line 75 until reaching full width at 76 and the forwardly moving outer edge of each blade, which is the left edge as shown in FIGURE 2, has a bent over portion 77 which bends in the direction of rotation, shown by the arrow 78. This bent over portion increases in width as the radius increases, as shown in FIGURE 3. The outer edges 79 of the blades are hardened and sharpened, and with the knife edge 62 form cooperating cutting surfaces, due to the close clearance at the scroll and the blade ends. The whole rotatable fan assembly is keyed to the shaft 65 by means of a key 81.

The material delivered by the machine accordingly slides down the chute 42 and is drawn into the fan and is thrown radially outwardly by the blades 72, but due to the close clearance between the end 79 of the blade and the adjacent fan scroll 56—57, the tendency of the material to bend over the end edges of the blades and drag is minimized. Where the fan housing departs from the circle shape at 57, the material is flung off the ends of the blades into the delivery housing 58—60, but if any material should be passing off the ends of the blades as the blade edges 79 pass adjacent the knife edge 62, such material will be cut sharply, and the blade will therefore not be subjected to frictional drag of material hanging around the edge of the blade, as it rotates. In this manner the power consumption of the fan is greatly reduced and the material passing through the fan is also better separated and broken apart.

At the front of the machine, and at approximately the level of the lower edges of top rail 15, there is a table plate 90, see FIGURES 1 and 2, which is provided with slots 91 extending back away from the rotor element 21, said slots being as wide as needed to provide clearance for the rotor element including teeth. The forward and extending portions 90A of the table plate would otherwise be unsupported, between these slots 91, except there are provided a plurality of posts 94 which have the shape as shown in FIGURE 2, that is to say a vertical front edge 94A and a rearward slanting edge 94B. The posts have a total width at the bottom so that they fit directly upon the front rail 10 at the lower edges 94C and have a width at the top so that they provide a line of support under the extending portions 90A of the table plate, almost to the front edge of the table plate. The chute plate 42 is slotted to receive the posts 94 and the posts and chute are welded together so as to provide mutual stiffening effect, and the front of the posts are tied together by a cross frame reinforcing T-bar 95, which is notched into the front edges of the posts and welded thereto, thereby providing stiffening. The portion above the front edge 42A of the chute is open to the atmosphere. The table plate 90 is arranged so that it can be aligned with the delivery end of a conveyor 100 having a delivery line 101, and conveyor chain 102 having teeth thereon for engaging the bales of material to be opened, said chain passing over the front sprocket 103.

Referring to the rotor 21, the rotor consists of a cylinder 121 and end discs 122—122, to which the cylinder is welded, with the shaft 20 passing through axial apertures in the end discs 122. In this way there is formed what is essentially a spool. At several places along the spool thus formed there are (prior to assembly) set breaker plates generally designated 123 and 124 which are of identical pattern. These breaker plates are rectangular, and have a width equal to the diameter of the circular end plates 122 forming the rotor spool. The breaker plates 122—123 are welded to the cylinder 121 so as to rotate with it and they are preferably set so that the sides of one of the breaker plates will be at 45 degrees to the sides of the next adjacent plate. In FIGURE 2 it shows the relative orientation of the plates on the spool. Where small sized bales are handled only one breaker plate may be required but it is preferred that the rotor 21 should have thereon two or more breaker plates 123—124, of which two are illustrated in the drawings. The width of the rotor 21, that is to say the distance between the inner faces of end plates 122—122 is somewhat more than the width of the larger bales being handled and the breaker plates 123—124 are arranged axially along the rotor 21 so as to provide approximately equal spaces 127, 128 and 129, see FIGURE 1. On the outer surface of the cylinder 121 and on the inner faces of the end discs 122, and upon opposite faces of the square breaker plates 123—124, and on the corners of such plates, there are arranged teeth which engage the surfaces of the bale and cut it and tear it apart into small pieces. The bale B shown in dotted lines in FIGURE 2 is illustrated as moving in the direction of arrow 130, being supported by the conveyor 100 and then the table 90 as it approaches the rotor 21. The bale is initially engaged by the corners of the breaker plates 123—124. If desired, these corners may simply be the edges of the plates and be cut off at the corners and notched as at 123B—123B, FIGURE 7, but it is preferred that these corners with the same configuration as shown be provided with a hard surfacing, or preferably with a removable tooth, which is illustrated in FIGURES 1, 2 and 4. Referring to these figures, the tooth construction is provided at 135—135. The construction of the teeth and its manner of mounting are shown in FIGURES 2 and 4. In these figures it will be noted that the tooth 135 is provided with a slot 135A which is just as thick as the plate 123 (or 124). The slot fits over the flat corner edge 123A at the corner of the plate 123 similarly for all corners of plate 123 and plate 124. Through the bifurcated end of the tooth, where it engages the edge of the plate 123 (or 124) there is fitted a recessed-head stud 136, which threads into one of the bifurcated sides of the tooth, thereby forming a firm clamping support for the tooth on the edge of the plate. Any suitable form of tooth mounting may be used. If a separate tooth construction is not used, the pattern of the plate is simply cut off as shown in FIGURE 7 and hard surfacing material may be put on the leading edges of the tooth which engage the bale.

The teeth on the inner faces of circular end plates 122, and upon the faces of plates 123 and 124 and on the outer surface of the drum 121 can simply be slugs of hard metal which are welded in place. In order, however, to make these teeth replaceable it is preferred to use a construction such as shown in FIGURES 5 and 6. According to this construction the direction of motion of the tooth is as shown by arrow 140, and at the place where a tooth is to be seated, there is welded on a small slug of metal 141, the welds being along sides 141A and 141B. This leaves the sides 141C and 141D square and true. The tooth 150 is shaped as shown in FIGURE 6 and is provided with a slot along its lower surface at 150A which is just wide enough to engage the faces 141C and 141D. With the tooth so located it is held in place by recessed cap screws 152—152 which are threaded into appropriately placed and tapped holes in the slug 141 on which the tooth is mounted. For the teeth that are mounted on flat surfaces such as the faces of discs 122—122 and the plates 123—124, the under surface of the tooth can be flat. For the teeth that are mounted on the cylinder 121, the under surface of the tooth is slightly curved so as to fit the cylinder. The teeth are scattered at random so that as the rotor 21 rotates, no two teeth will track behind each other. Thus the teeth 151-1, 151-2 and 151-3, etc. on the cylinder 121 are set around the cylinder but at axial spacing along the cylinder so that they do not track. In FIGURE 2 there is illustrated a pattern of spacing for the teeth on each side of the plates 123—124, the plate 123 being illustrated. It will be understood that the teeth opposite working faces of these plates can be placed diametrically opposed and thus complete balance can be obtained. For example, for breaker plate 123 there are shown teeth ranging from 151-4 through 151-11. It will be noted that these are spaced inwardly from each other so that as a group they are placed evenly spaced from a position just adjacent the corner to a position adjacent the cylinder but they are not in a spiral. Teeth which are nearly the same radii are set 180° apart from each other. In this way the teeth on one side of the plate are nearly balanced. Then by making the pattern of positions of all teeth on the far side of the plate the mirror image of those on the near side (which is shown), a complete balancing of the plate can be achieved. This is done for each breaker plate 123 and 124.

A number of teeth are also set on the inside of the end disc 122 and arranged in similar pattern, as shown by the dotted line 151-12 through 151-16, as shown in dotted lines in FIGURE 2. The exact number of teeth used on any of the plates and on the drum 121 is not critical and may be varied according to the service to which the mill is subjected. Teeth may be either permanently welded on or constructed so as to be removable. By placing teeth on the faces of the breaker plates 123 and 124 and on the inner faces of discs 122, the amount of friction which might otherwise be imposed on these faces is greatly reduced. This factor is very important with reference to the cutter plates 123—124. In respect to these plates the corner teeth 123—123 could cut slots in the bale and as the slot becomes deeper the bale would drag on the side faces of the cutter plates 123—124 were it not for the fact that the plates are provided with teeth on opposite faces which thereby serve to increase the width of the slots and thereby decrease drag of the bale on these faces of the plates. This contributes markedly to reduction and power of the unit.

As the bale B is cut it is first cut into several slices and is then torn apart along the edges of the cut, and eventually the slices of the bale reach the surface of the rotating cylinders 121 which again being tooth-covered shred the end portions of these slices into small pieces the bale meanwhile being supported on the table 90 and only so much of the bale as is composed of small particles passes over the edge of the table 90 and along the slots and are discharged.

The rotor induces a certain amount of draft, and the broken-up material already shredded to relatively fine pieces is dropped in the chute and the product slides down the smooth surface of the chute directly into the fan blading 70 which, being rotated at a high rate of speed, throws the material radially outwardly against the inner portion of the scroll 56—57 of the fan housing, and upon reaching the delivery opening 56—61, the material is projected out through the opening under pneumatic pressure. A considerable amount of further shredding and size reduction of the material occurs in the fan.

In the event of any stoppage or clogging of the fan, it is only necessary to uncouple the coupling 66, and swing back the entire fan housing 50 for servicing.

When the housing 50 of the fan is closed, it is held in place by both our clamps, not illustrated.

As many apparently widely different embodiments of this invention may be made without departing from the spirit and scope thereof, it is to be understood that we do not limit ourselves to the specific embodiments disclosed herein.

What we claim is:

1. A bale shredder comprising a frame, a spool composed of circular end flanges with a cylinder between them, said spool being journalled for rotation on the frame, a housing enclosing said spool, said housing having an inlet chute terminating adjacent the cylinder and below its axis of rotation and an outlet below the spool and polygonal plates mounted on the cylinder at spaced intervals between the end flanges of the cylinder and normal to the axis of the cylinder for rotation therewith, said plates presenting projecting corners forming cutting edges, and cutter teeth mounted at spaced intervals on those surfaces of the end flanges which face the polygonal plates and on the faces of the polygonal plates and on the cylinder.

2. A bale shredder comprising a frame, a spool composed of circular end flanges with a cylinder between them, said spool being journalled for rotation on the frame, a housing enclosing said spool, said housing having an inlet chute terminating adjacent the cylinder and below its axis of rotation thereof and an outlet below the spool, several breaker plates mounted normal to the cylinder so as to divide the length of the cylinder into several substantially equal spaces, said breaker plates having not more than four equal sides of a length such that the corners of the breaker plates describe a common path of rotation of greater diameter than the end plates, a plurality of widely separated lugs on the cylinder and on the sides of the end flanges which face the breaker plates and on the sides of the breaker plates.

3. The bale shredder specified in claim 2 further characterized in that there are four square breaker plates.

4. The bale shredder specified in claim 2 further characterized in that the lugs are detachably secured.

References Cited in the file of this patent
UNITED STATES PATENTS

| | | |
|---|---|---|
| 860,916 | Harrison | July 23, 1907 |
| 1,365,927 | Lindsey et al. | Jan. 18, 1921 |
| 1,884,279 | Gossard | Feb. 9, 1932 |
| 2,064,689 | Russwurm | Dec. 15, 1936 |
| 2,646,934 | Sandor | July 28, 1953 |
| 2,681,090 | Hicks et al. | June 15, 1954 |
| 2,800,286 | Bryant | July 23, 1957 |
| 2,858,080 | Couchot | Oct. 28, 1958 |
| 2,903,193 | Anderson | Sept. 8, 1959 |

FOREIGN PATENTS

| | | |
|---|---|---|
| 870,613 | Germany | Apr. 1, 1954 |
| 887,126 | Germany | Aug. 20, 1953 |